United States Patent

Levinson et al.

Patent Number: 5,332,538
Date of Patent: Jul. 26, 1994

[54] METHOD FOR MAKING A SPACER ELEMENT FOR A MULTI-PANE SEALED WINDOW

[75] Inventors: Lionel M. Levinson, Schenectady; William N. Schultz, Niskayuna; Larry N. Lewis; Chris A. Sumpter, both of Scotia; Judith Stein, Schenectady; Michael A. Zumbrum, Clifton Park, all of N.Y.

[73] Assignee: General Electric Company, Schenectady, N.Y.

[21] Appl. No.: 970,429

[22] Filed: Nov. 2, 1992

[51] Int. Cl.⁵ .................................................. B29C 35/08
[52] U.S. Cl. ................................................ 264/25; 52/172; 52/790; 156/109; 264/252; 264/259; 264/347
[58] Field of Search ................. 524/862; 264/252, 25, 264/347, 259, 22; 52/172, 171, 790; 156/109

[56] References Cited

U.S. PATENT DOCUMENTS

| | | | |
|---|---|---|---|
| 3,791,910 | 2/1974 | Bowser | 252/194 |
| 3,832,254 | 8/1974 | Bowser et al. | 428/34 |
| 3,998,680 | 12/1976 | Flint | 428/34 |
| 4,013,566 | 3/1977 | Taylor | 252/194 |
| 4,055,031 | 10/1977 | Okawa et al. | 428/34 |
| 4,081,397 | 3/1978 | Booe | 252/194 |
| 4,109,431 | 8/1978 | Mazzoni et al. | 428/34 |
| 4,226,063 | 10/1980 | Chenel | 52/172 |
| 4,232,492 | 11/1980 | Remick et al. | 52/172 |
| 4,328,972 | 5/1982 | Albertson et al. | 264/259 |
| 4,476,169 | 10/1984 | Nishino et al. | 428/34 |
| 4,615,823 | 10/1986 | Tokuyama et al. | 252/194 |
| 4,831,799 | 5/1989 | Glover et al. | 52/172 |
| 4,838,006 | 6/1989 | Grosch | 52/172 |
| 4,951,927 | 8/1990 | Johnsen et al. | 264/252 |
| 4,961,888 | 10/1990 | Brown | 264/40.6 |
| 4,981,637 | 1/1991 | Hyer | 264/347 |
| 5,007,217 | 4/1991 | Glover et al. | 52/172 |
| 5,061,531 | 10/1991 | Catalano | 264/252 |
| 5,078,909 | 1/1992 | Shigeta et al. | 252/194 |

FOREIGN PATENT DOCUMENTS

| | | | |
|---|---|---|---|
| 54-53164 | 4/1979 | Japan | 524/862 |
| 57-110433 | 7/1982 | Japan | 264/25 |

Primary Examiner—Jeffery Thurlow
Attorney, Agent, or Firm—William A. Teoli; William H. Pittman

[57] ABSTRACT

A method is provided for making a rigid spacer, containing a silicone bound desiccant which is useful for a multi-pane sealed window. An infrared radiation curable silicone is used as a binder for a desiccant such as a zeolite which is injected in a continuous manner into a U-shaped or V-shaped semi-rigid spacer such as a steel channel.

8 Claims, 1 Drawing Sheet

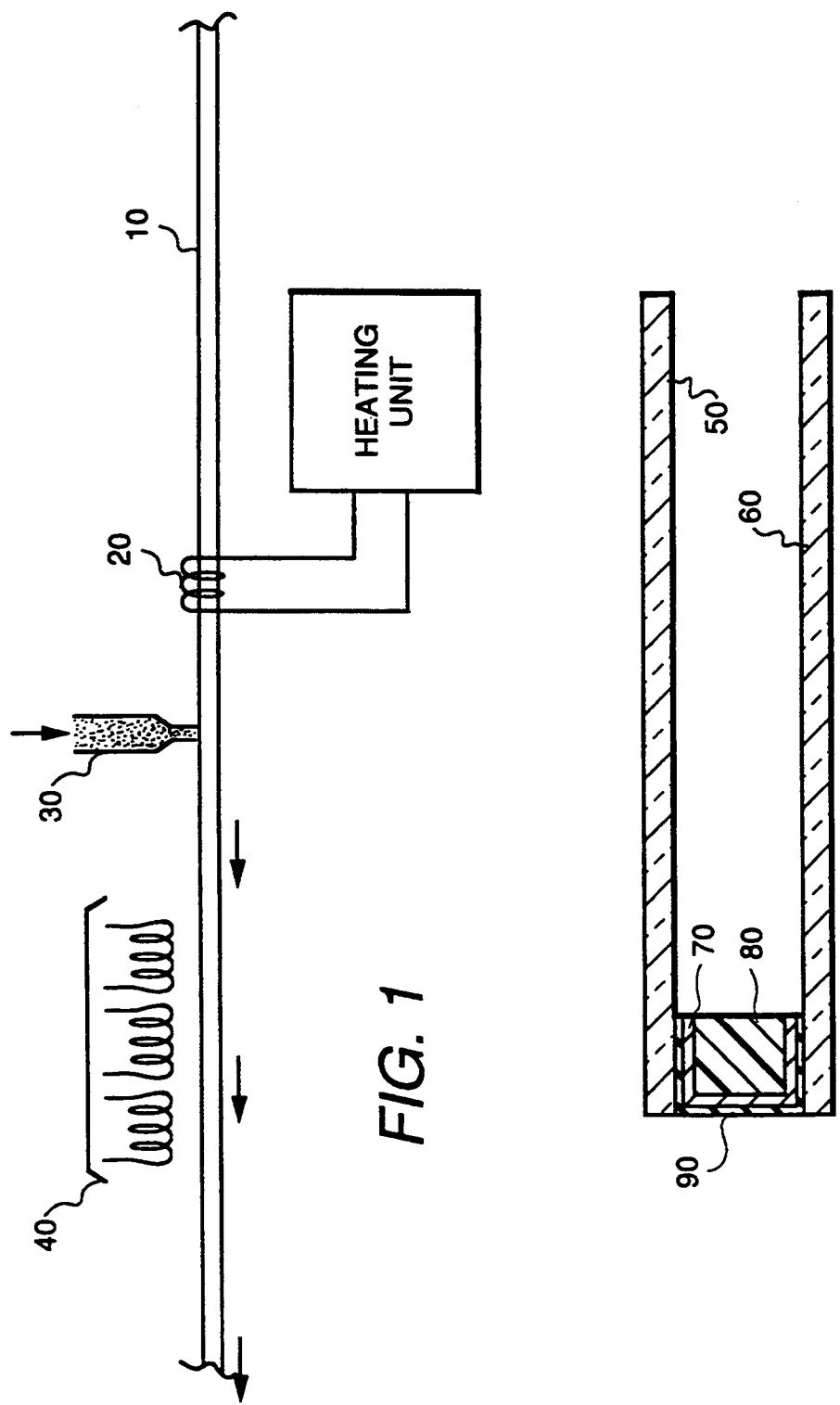

METHOD FOR MAKING A SPACER ELEMENT FOR A MULTI-PANE SEALED WINDOW

CROSS REFERENCE TO RELATED APPLICATION

Reference is made to copending application Ser. No. 07/970,498 filed concurrently herewith.

BACKGROUND OF THE INVENTION

The present invention is directed to a method which employs infrared radiation to effect the cure of a desiccant filled silicone composition in a rigid or semi-rigid spacer for a multi-pane sealed window.

Chenel, U.S. Pat. Nos. 4,226,063 and 4,205,104, shows multi-pane sealed windows having a silicone and butyl rubber as flexible spacer sealing elements. In U.S. Pat. No. 4,622,249, similar materials are used as spacers. However, the butyl rubber is used as the outer sealant and a desiccant filled silicone sealant is employed as the inner spacer. In U.S. Pat. No. 5,007,217, an inner spacer is made from a moisture permeable flexible or semi-rigid foam material which incorporates a desiccant material. In many situations, a more rigid material is preferred as the spacer, because the glazing unit often incorporates a heat shrinkable plastic film which can be applied in a final assembly step. Sufficient spacer rigidity often is needed to prevent wrinkles from being formed at the corners following heat shrinking of the plastic film.

Because of its rigidity, steel is often preferred as the spacer for multi-pane window applications. In addition, dehydrated zeolites, which are derived from hydrated aluminum and calcium or sodium silicates have gained wide acceptance as desiccants. In one design, the desiccant is used directly in a steel tubular spacer having perforated walls. Moisture uptake is achieved through the walls of the spacer when in place. Because the desiccant is sometimes incorporated at the terminus of the spacer, it can be difficult to incorporate the desiccant in an economic manner.

Preferably, the spacer has a readily accessible U-shaped or V-shaped open channel. However, in order to minimize loss of the desiccant through spillage, a heat curable desiccant binder is often needed which allows the mixture to remain stable and flowable for at least 60 minutes below about 50° C. In addition, the resulting cured product must be adherent to the spacer wall, while maintaining its moisture absorbing capability once it is installed in the multi-pane window structure.

SUMMARY OF THE INVENTION

In copending application RD-22,025 for Infrared Radiation Curable Organopolysiloxane compositions, silicone materials are described which can be cured by use of infrared radiant energy. It has been found that when a desiccant, such as a zeolite, is blended with an infrared radiation curable silicone material, the resulting curable silicone composition is flowable; it can be readily dispensed into a rigid spacer, such as a steel, or a thermoplastic; thereafter it can be readily cured utilizing infrared radiation. The resulting cured silicone product also has been found adherent to the walls of the spacer while retaining its moisture absorbing capability.

STATEMENT OF THE INVENTION

There is provided by the present invention, a method which comprises, (1) injecting into a semi-rigid thermoplastic or metal spacer having a V-shaped or U-shaped channel and useful for a multi-pane sealed window, a flowable infrared radiation curable silicone composition, and thereafter (2) exposing the dispensed infrared radiation curable silicone composition to infrared radiation have a wavelength of 700 to 10,000 nm and an intensity of at least 0.5 to 100 watts/cm$^2$ until it is substantially cured, where the infrared radiation curable silicone composition comprises by weight, (A) 100 parts of a poly(alkenylsiloxane),
(B) 1 to 20 parts of a silicon hydride siloxane,
(C) 0.0001 to 10.0 parts of an infrared radiation absorbent or scattering material,
(D) an effective amount of a platinum group metal curing catalyst, and
(E) 20 to 300 parts and preferably 120–220 parts of a desiccant.

Desiccants which can be utilized in the infrared radiation curable silicone compositions used in the practice of the method of the present invention are for example, 3A molecular sieves, 4A molecular sieves, 5 A molecular sieves, 10x molecular sieves, 13x molecular sieves, silica gel, alumina, magnesium sulfate, calcium chloride and calcium sulfate.

The poly(alkenylsiloxane) or "vinylsiloxane" utilized in the infrared radiation curable organopolysiloxane compositions of the present invention can have a viscosity of from about 100 to 200,000 centipoise and a vinylsiloxy unit content of about 0.05 to about 3.5 mole %, and preferably 0.14 to about 2 mole % based on the total siloxy units having one or more organo radicals, as defined hereinafter, attached to silicon. The preferred vinyl siloxanes are included within the following formula,

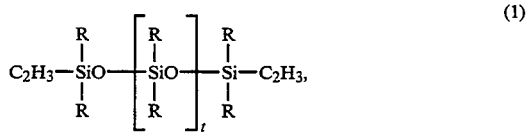

where $C_2H_3$ is vinyl, and R is selected from $C_{(1-13)}$ monovalent hydrocarbon radicals free of olefinic unsaturation, and t is a positive integer having a value sufficient to provide a vinyl siloxane viscosity of from about 100 to 200,000 centipoise at 25° C. Preferably, R is selected from alkyl radicals of 1 to 8 carbon atoms, such as methyl, ethyl, propyl; mononuclear aryl radicals such as phenyl, methylphenyl, ethylphenyl; cycloalkyl radicals, cycloheptyl and haloalkyl radicals such as 3,3,3-trifluoropropyl. Preferably, the vinyl siloxane has terminal units of the formula,

The vinylsiloxanes of Formula (1) are generally prepared by equilibrating the appropriate cyclotetrasiloxane with appropriate vinyl terminated low molecular weight polysiloxane chain-stoppers. However, if vinyl organosiloxy units are desired in the backbone, a predetermined amount of cyclic vinyl organosiloxane can be used in the equilibration mixture. A preferred chain-stopper for the equilibration reaction is a low molecular weight vinyl terminated organopolysiloxane such as the corresponding disiloxane, trisiloxane, tetrasiloxane. These low molecular weight vinyl terminated polysiloxane polymers are produced by hydrolyzing the appropriate chlorosilanes particularly vinyl diorganochlorosilanes along with diorganodichlorosilanes to produce the desired chain-stopper. The chain-stopper can be equilibrated with octamethylcyclotetrasiloxane in the presence of a catalyst to produce the desired vinyl siloxane having a viscosity varying from 100 to 200,000 centipoise at 25° C. The catalyst that is utilized is preferably a mild acid catalyst, such as toluenesulfonic acid or an acid treated clay such as Filtrol, which is a sulfuric acid activated clay manufactured and sold by Engelhard Corp. of Edison, N.J. When the equilibration has proceeded to about 85% completion, the acid catalyst can be neutralized with a base or simply filtered if acid activated clay is used to leave behind the linear polymer. Preferably, excess cyclics are stripped off so that the linear polymer will have a low volatile content and be relatively pure. There can also be utilized an alkali metal hydroxide as the catalyst such as for instance potassium or sodium hydroxide.

The silicon hydride siloxane or "siloxane hydride" used in the invention can have about 0.04 to about 1.4 % by weight of chemically combined hydrogen attached to silicon. One form of siloxane hydride siloxane is a "coupler" having the formula,

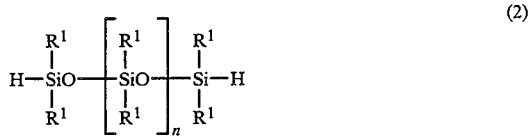

(2)

where $R^1$ is selected from $C_{(1-13)}$ monovalent hydrocarbon radicals free of olefinic unsaturation and n is an integer having a value sufficient to provide the "coupler" with a viscosity of 1 to 500 centipoise at 25° C. and from about 3 to 9 mole percent of chain-stopping diorganohydride siloxy units, based on the total moles of chemically combined siloxy units in the silicon hydride siloxane fluid In addition to the silicone hydride coupler of formula (2), the siloxane hydride used in the heat curable organopolysiloxane compositions of the present invention also can include silicon hydride resins consisting essentially of the following chemically combined units,

chemically combined with $SiO_2$ units, where the $R^2+H$ to Si ratio can vary from 1.0 to 2.7. Silicon hydride resin also can have units of the formula,

chemically combined with $SiO_2$ units and $(R^4)_2SiO$ units, where the $R^3+R^4+H$ to Si ratio can vary from 1.2 to 2.7, where $R^2$, $R^3$ and $R^4$ are $C_{(1-13)}$ monovalent hydrocarbon radicals free of olefinic unsaturation selected from $R^1$ radicals.

The siloxane hydride can be made by hydrolyzing the corresponding hydride chlorosilanes in the presence of an organic hydrocarbon solvent. For resins having only monofunctional units and tetrafunctional units, a hydrogen diorganochlorosilane can be hydrolyzed with a tetrachlorosilane. Resins having monofunctional siloxy units, difunctional siloxy units, and tetrafunctional siloxy units, can be obtained by hydrolyzing a hydrogen diorgano dichlorosilane, a tetrachlorosilane and a diorganodichlorosilane at particular ratios. Additional silicon hydride resin are shown by Jeram, U.S. Pat. No. 4,040,101 which is hereby incorporated by reference.

The siloxane hydride also can include linear hydrogen containing polysiloxane having the formula,

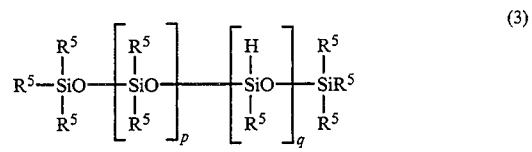

(3)

where $R^5$ is a $C_{(1-13)}$ monovalent hydrocarbon radical free of olefinic unsaturation, selected from $R^1$ radicals, and p and q are integers having values sufficient to provide a polymer having a viscosity of from 1 to 1,000 centipoise at 25° C.

The siloxane hydride of formula (3) can be produced by equilibrating the appropriate hydrogen cyclopolysiloxane with the appropriate cyclopolysiloxane containing $R^5$ substituent groups, in combination with low molecular weight linear triorganosiloxy endstopped chain-stoppers.

In formulas (2) and (3) and the chemically combined units described above, $R^1$, $R^2$, $R^3$, $R^4$ and $R^5$ can be the same or different radicals selected from the group consisting of alkyl radicals of 1 to 8 carbon atoms, such as methyl, ethyl, propyl, etc.; cycloalkyl radicals such as cyclohexyl, cycloheptyl, etc.; aryl radicals such as phenyl, tolyl, xylyl, etc.; and haloalkyl radicals such as 3,3,3-trifluoropropyl.

The silicon hydride coupler of formula (2) can be prepared by a hydrolysis process or an acid catalyzed equilibration process. In the equilibration process, the appropriate cyclotetrasiloxanes are equilibrated with a low molecular weight hydrogen terminated chain-stopper, such as a dihydrogen tetraorganodisiloxane. The acid catalyzed equilibration reaction is much the same as disclosed for the production of the vinyl containing base polymer. By the hydrolysis process, the appropriate hydrogen diorganochlorosilanes are hydrolyzed with the appropriate amount of diorganodichlorosilanes to produce the desired polymer of formula (3) above. When the silicon hydride coupler is produced, it can be separated from the undesirable amount of cyclics by stripping.

Various complexes can be used as the platinum group metal catalyst for the thermally-activated addition reaction between the vinyl siloxane and the silicon hydride siloxane. Some of the platinum group metal catalysts which can be employed to effect the hydrosilation reaction are, for example, rhodium, ruthenium, palladium, osmium, iridium and platinum. Especially preferred are the well known platinum and rhodium catalysts, such as the platinum hydrocarbon complexes described in U.S. Pat. Nos. 3,159,601 and 3,159,662 to Ashby, the platinum alcoholate catalysts described in U.S. Pat. No. 3,220,972 to Lamoreaux, the platinum complexes of U.S. Pat. No. 3,814,730 to Karstedt, the platinum chlorideolefin complexes described in U.S. Pat. No. 3,516,946 to Modic and the rhodium complexes described in U.S. Pat. No. 4,262,107 to Eckberg, all of which are incorporated herein by reference.

An effective amount of the platinum catalyst is an amount of platinum catalyst sufficient to provide from 5 ppm to 200 ppm of platinum based on the total weight of the infrared curable silicone composition and preferably from 10 to 100 ppm.

In addition to platinum group metal catalysts, catalyst inhibitors can be used to extend the pot life of the infrared curable silicone composition. Some of the inhibitors which can be used are acetylenic alcohols as described in U.S. Pat. No. 4,603,168 to Susaki, acetylenic dicarboxylates as described in U.S. Pat. No. 4,943,601 to Dinallo, acetylenic alpha ketones as described in U.S. Pat. No. 4,595,739 to Cavazzan, alkynylsilanes as described in U.S. Pat. No. 4,472,562 to Shirahata, ene-ynes as described in U.S. Pat. No. 4,465,818 to Shirahata, maleates as described in U.S. Pat. No. 4,783,552 to Lo, fumarates as described in U.S. Pat. No. 4,774,111 to Lo, maleimides and monomaleates as described in U.S. Pat. No. 4,530,989 to Michel, vinyl acetate as described in U.S. Pat. No. 4,476,166 to Eckberg, carboxylic esters as described in U. S. Pat . No. 4,340,647 to Eckberg, Dialkyl azodicarboxylates as described in U.S. Pat . No. 4,670,531 to Eckberg, isocyanurates as described in U.S. Pat. No. 3,882,083 to Berger, 1,4-dicarboxylic acids as described in U.S. Pat . No. 4,448,815 to Grenoble, azo compounds as described in U.S. Pat. No. 3,862,081 to Ito and U.S. Pat. No. 5,122,585 to Sumpter, allenes as described in EP 145,526 to Cavezzan, cyclic vinyl siloxanes as described in EP 252,858 to Cavezzan, trienes as described in U.S. Pat. No. 4,741,966 to Cavezzan, alkenecyclohexenes as described in U.S. Pat. No. 4,699,813 to Cavezzan, amines as described in U.S. Pat . No. 4,584,361 to Janik, hydrazones as described in U.S. Pat. No. 4,710,559 to Essinger, amides as described in U. S . Pat . No. 4,337,332 to Melanchon, vinyl silicones as described in U.S. Pat. No. 4,785,066 to Maxson, isothiocyanates as described in EP 384,325 to Irifure and triazoline diones as described in copending application Ser. No. 07/800,310, filed Nov. 19, 1991, to Sumpter, all of which are incorporated herein by reference.

Latent platinum group metal catalysts are also effective for the thermally-activated addition reaction between the vinyl siloxane and the silicon hydride siloxane. The latent catalysts allow the preparation of one-part formulation containing the vinyl siloxane, an effective amount of the latent platinum group metal catalyst and the silicone hydride siloxane, while still allowing a flowable mixture stable for at least 5 days at 50° C. Some of the latent catalysts which can be employed to effect the hydrosilylation reaction at elevated temperatures of at least 100° C. are, for example, the product of the reaction of a zero valent platinum complex as described by Karstedt in U.S. Pat. No. 3,775,452 with dialkyl azodicarboxylates, azo compounds, triazoline diones and aromatic nitrogen heterocycles as described in copending application serial no. 07/800,311, filed Nov. 29, 1991, to Sumpter and inclusion compounds of a cyclodextrin and a complex of a 1,5-cyclooctadiene and a platinum group metal material such as a platinum halide as described in U.S. Pat. No. 5,025,073 to Lewis and U.S. Pat Nos. 5,106,939, 5,132,385 and 5,132,442 to Sumpter, all of which are incorporated herein by reference.

Infrared radiation absorbent materials which can be utilized in the practice of the present invention are for example, inorganic materials, such as carbon blacks and graphites, cerium oxide, titanium oxide, iron (III) oxide and ceramics, such as porcelain; infrared absorbing pigments, such as Prussian blue, organometallic compounds, such as (methylcyclopentadienyl)manganese tricarbonyl, (tetraphenylcyclobutadiene) (cyclopentadienyl)cobalt, organic compounds, such as anthracene, phenanthracene, anthraquinone and phenanthracenequinone. It has been found that depending upon the particular infrared radiation absorbent material used, the effective weight proportion of the absorbent material, per 100 parts by weight of the poly(alkenyl organosiloxane) can vary widely. For example, carbon blacks, such as furnance blacks, thermal carbon blacks, acetylene blacks, channel blacks and lamp blacks with ASTM designators outlined in ASTM D1765-67. An effective amount of carbon black will give an absorption or scattering of the radiation by the bulk volume of the silicone composition of 10-90%. Carbon black is effective at 0.0001 to 0.05 parts and preferably 0.0001 to 0.01 parts by weight. Infrared absorbing pigments can be used in the range of 0.0005 to 4 parts by weight, and preferably 0.001 to 2.5 parts by weight.

BRIEF DESCRIPTION OF THE DRAWING

Reference is made to FIG. 1 which shows a side sectional view of a U-shaped or V-shaped metallic spacer being conveyed through an initial heating stage followed by a desiccant dispensing stage and a bank of infrared lamps.

In FIG. 1A, there is shown a sectional side view of a multi-pane window having a desiccant filled sealed spacer element in a multi-pane window.

More particularly, there is shown in FIG. 1 at 10, a side view of a U-shaped or V-shaped rigid spacer, which can be metallic, such as steel or aluminum, or extruded organic thermoplastics, such as polyesters, polyethers, polycarbonates, polyphenylene oxides or polyarylether ketones. The spacer has been shaped from a metallic channel forming or an organic thermoplastic extrusion device not shown. An optional heating means, such as an inductor, in instances when a metallic spacer such as steel is used, is shown at 20. A dispensing unit, which is capable of delivering the infrared radiation curable silicone composition, or silicone treated desiccant, into the open face of a U-shaped or V-shaped spacer is shown at 30. At 40 there is shown a bank of infrared lamps capable of delivering infrared radiation having a wavelength of 700 to 10,000 nm and an intensity of from 0.5 watts/cm$^2$ to 100 watts/cm$^2$ and preferably from 3.0 watts/cm$^2$ to 40.0 watts/cm$^2$.

In FIG. 1A, there is shown at 50 and 60, a partial sectional view of window panels of a multi-pane sealed window. At 70 there is shown a terminal section of a spacer containing the cured silicone treated desiccant at 80. At 90, there is shown a cured rubber sealant, such as a butyl rubber sealant which is initially applied on the side walls of the spacer element prior to contact with the glass panels followed by a final end sealant treatment on all sides of the multi-pane structure.

If a metallic spacer such as steel is used, it is preferably preheated prior to its being injected with the silicone treated desiccant and its exposure to infrared radiation. Assuming a thermal diffusivity of about $2 \times 10^3$ cm$^2$ per second for the infrared radiation curable silicone composition, preheating of the metallic spacer to a temperature of 150° C. to 200° C. has been found to maintain the substrate temperature during the critical curing stage under the infrared radiation zone. There are included other heating means in addition to induction, such as hot oil, electric resistance or open flame.

In order that those skilled in the art will be better able to practice the method of the present invention, the following example is given by way of illustration and not by way of limitation. All parts are by weight.

EXAMPLE

A desiccant filled addition curable silicone composition is prepared as follows: A 1.67:1 desiccant silicone matrix base is prepared by combining in a Ross Dual Planetary mixer, 37.5 parts of a vinyl terminated dimethylsiloxane fluid having a viscosity of 400 centipoise, 62.5 parts of 3 A molecular sieves, and 40 ppm (0.004 parts) of an acetylene carbon black (ASTM designator N582) having a surface area of 80 $m^2/g$ (nitrogen absorption) to give a smooth gray flowable mixture.

To 148 g of the above base is added 30 ppm of Pt as a preformed latent catalyst as described in copending application serial no. 07/800,311, filed Nov. 29, 1991, incorporated herein by reference. To the resulting mixture there is added 1.5 parts of a siloxane hydride fluid consisting essentially of condensed methylhydrogensiloxy units, dimethylsiloxy units and terminated with trimethylsiloxy units having a viscosity of 50–150 centipoise and 0.8 weight percent of hydrogen. There is obtained an addition curable desiccant filled silicone formulation having at least 7 days stability (viscosity increase less than 2 times) at 500° C.

A $\frac{1}{4}"\times 9/16"\times 13\frac{1}{2}"$ U-shaped rigid steel window spacer section is heated to 200° C. on a copper block. The spacer is then immediately injected with 13.5 to 17.6 grams (1.0–1.3 g/inch) of the above addition curable silicone formulation. The filled spacer is then immediately placed to a position 1" beneath a 7.0 watts/$cm^2$ tungsten-halogen infrared radiation source (unfocused) to give a fully cured formulation after a 10 second exposure.

What is claimed is:

1. A method which comprises,
   (1) dispensing into a semi-rigid thermoplastic or metal spacer having a V-shaped or U-shaped channel and useful for a multi-pane sealed window, an infrared radiation sensitive heat curable silicone composition, and thereafter
   (2) exposing the dispensed infrared radiation curable silicone composition to infrared radiation have a wavelength of 700 to 10,000 nm and an intensity of at least 0.5 to 100 watts per $cm^2$ until it is substantially cured, where the infrared sensitive heat curable silicone composition comprises by weight,
   (A) 100 parts of a poly(alkenylorganosiloxane),
   (B) 1 to 20 parts of a silicon hydride siloxane,
   (C) 0.0001 to 10.0 parts of an infrared radiation absorbent or scattering material,
   (D) an effective amount of a platinum group metal curing catalyst, and
   (E) 120 to 220 parts of a zeolite.

2. A method in accordance with claim 1, where a steel spacer is used as the semi-rigid spacer.

3. A method in accordance with claim 1, where the semi-rigid spacer is an organic thermoplastic.

4. A method in accordance with claim 1, where the poly(alkenylorganosiloxane) is a poly(vinylmethylsiloxane) fluid.

5. A method in accordance with claim 1, where the silicon hydride siloxane is a methyl hydride siloxane.

6. A method in accordance with claim 1, where carbon black is used as the infrared radiation absorbent material.

7. A method in accordance with claim 1, where a latent platinum catalyst is used.

8. A method in accordance with claim 1, where the infrared radiation absorbent or scattering material is an organic, inorganic or organometallic material.

* * * * *